United States Patent [19]
Ziv-El

[11] Patent Number: 5,437,555
[45] Date of Patent: * Aug. 1, 1995

[54] REMOTE TEACHING SYSTEM

[75] Inventor: Jakob Ziv-El, Herzliya, Israel

[73] Assignee: Discourse Technologies, Inc., Milwaukee, Wis.

[*] Notice: The portion of the term of this patent subsequent to Nov. 23, 2010 has been disclaimed.

[21] Appl. No.: 112,103

[22] Filed: Aug. 26, 1993

Related U.S. Application Data

[63] Continuation-in-part of Ser. No. 694,650, May 2, 1991, Pat. No. 5,263,869.

[51] Int. Cl.$^6$ .............................................. G09B 7/00
[52] U.S. Cl. ................................... 434/336; 434/323; 434/350; 379/97; 379/102; 395/927
[58] Field of Search ............... 434/118, 169, 185, 307, 434/308, 322, 323, 335, 336, 350, 362; 379/94, 95, 98, 105, 102, 97; 395/11, 200, 927; 364/419.2; 273/439

[56] References Cited

U.S. PATENT DOCUMENTS

| | | |
|---|---|---|
| 3,641,685 | 2/1972 | Zawels et al. |
| 3,654,708 | 4/1972 | Brudner .............................. 434/307 |
| 3,882,538 | 6/1975 | Lowe .................................. 434/307 X |
| 4,539,435 | 9/1985 | Eckmann ............................ 434/307 X |
| 4,715,818 | 12/1987 | Shapiro et al. .................... 434/350 X |
| 4,764,120 | 8/1988 | Griffin et al. ..................... 434/350 X |
| 4,767,335 | 8/1988 | Curt .................................. 434/350 X |
| 4,785,472 | 11/1988 | Shapiro ............................. 434/307 X |
| 4,820,167 | 4/1989 | Nobles et al. ..................... 434/307 X |
| 4,877,408 | 10/1989 | Hartsfield ......................... 434/350 |
| 4,963,097 | 10/1990 | Anjer ................................ 434/336 X |
| 5,011,414 | 4/1991 | Yoshizawa et al. ............... 434/336 X |
| 5,018,082 | 5/1991 | Obata et al. ...................... 434/118 X |
| 5,176,520 | 1/1993 | Hamilton .......................... 434/350 |
| 5,204,813 | 4/1993 | Samph et al. ..................... 434/350 X |
| 5,263,869 | 11/1993 | Ziv-El ............................... 434/350 X |
| 5,303,042 | 4/1994 | Lewis et al. ...................... 434/307 X |

FOREIGN PATENT DOCUMENTS 0200053  8/1990  Japan .................................. 434/350

OTHER PUBLICATIONS

S. L. Robinson and F. C. Roberts, "Technologies For Group-Based Instruction", Third International Conference and Exhibition on Children in the Information Age: Human Development and Emerging Technologies, Sofia, Bulgaria, Nov. 1988.

S. L. Robinson, "Adaptive Instruction in Mainstream Classes: A Computer-Based Alternative for Learning Disabled Children", 1987.

S. L. Robinson, "Technology Assisted Group Instruction: Applications For The Handicapped", 1985 Computer Technology for the Handicapped Conference, Nov. 2, 1985.

S. L. Robinson and C. DePascale, "Effects of a Technology-Based Communication System On Student Responding and Teacher Questioning", 1987.

*Primary Examiner*—Joe H. Cheng
*Attorney, Agent, or Firm*—Merchant, Gould, Smith, Edell, Welter & Schmidt

[57] ABSTRACT

A computerized teaching system is described including an interactive group communication system, wherein students interact with a teacher and the teacher can obtain quantitative reports on student performance without preprogrammed lessons and where a lesson program can be constructed from the responses of the students. The teaching system may be spread over a large geographic area comprising a multiplicity of learning centers with a multiplicity of students at each center, wherein the students interact with a teacher who is remotely located from one or more learning centers.

21 Claims, 7 Drawing Sheets

REMOTE TEACHING SYSTEM

This application is a continuation-in-part of application Ser. No. 07/694,650, now U.S. Pat. No. 5,263,869, filed May 2, 1991, entitled "INTERACTIVE GROUP COMMUNICATION SYSTEM", which is assigned to the assignee of the present invention, and which is incorporated herein.

BACKGROUND OF THE INVENTION

1. Field of the Invention

This invention relates in general to a computerized teaching system, and in particular to a computerized interactive group communication system including remote teaching.

2. Description of Related Art

The present invention is applicable to both the field of education and to group decision-making. It will therefore be generally understood that the terms "teacher" and "group leader" as used herein are interchangeable, and that the terms "student" and "participant" as used herein are also interchangeable.

Existing computer-based networks that are used in a classroom in a school, or for group decision making, are one of two types: Independent Mode and Social Mode.

Independent Mode refers to a design that allows students to interact with a program at their own pace. One example of an Independent Mode network is the PLATO TM system provided by Control Data Corporation.

Social Mode refers to a design that allows many students to respond simultaneously to a question posed by a teacher.

A prior system which can be used either in Social Mode or in Independent Mode is the Discourse System, which is described in U.S. Pat. No. 3,641,685, issued Feb. 15, 1972, to J. Zawels et al., which patent is incorporated by reference herein.

Independent Mode systems rely on a stored lesson program which includes explanatory material, questions and the correct answers to the questions. Accordingly, depending on the responses of students, feedback information can be given automatically to a student as to the correctness of his/her response and the score can be obtained automatically at the end of a lesson indicating how many responses each student answered correctly.

Social mode systems can also rely on pre-programmed correct answers. The explanatory material and the questions however may be either also pre-programmed or may be stated verbally by the teacher. Where a pre-programmed correct answer is available feedback information can be given to a student as to the correctness of a response and the score may also be allocated here for each student at the end of a lesson. If the explanatory material and questions are preprogrammed the teacher may cause these to be displayed either on the student terminals or on a central monitor which is referred to as a Public Display.

A lesson program comprises a multiplicity of numbered frames. Each frame may contain one or more answers to a question, relevant explanatory material and the relevant question to be asked. A frame which does not have such information is referred to as an empty frame.

The explanatory material may also be in the form of Audio Visual (A-V) devices which are actuated automatically from information stored within each frame.

In both Social Mode and Independent Mode a programmed lesson is normally constructed by the teacher or a programmer before a lesson is given. It is a relatively time consuming operation.

In the case of lessons with pre-programmed lessons it is important to indicate to a student as soon as possible the correctness of his/her response. This feedback in the case of a correct response is referred to as an reinforcement. The speed with which this feedback is given to a student is particularly critical were the frame is programmed to give letter-by-letter reinforcement, i.e. where it is intended that with every character of a student's response, reinforcement be given to indicate whether the student is on the right track. This is because a student's typing speed should not be impeded by the student having to wait for possible reinforcement on each keystroke.

A further feature, particularly in Social Mode, is that the teacher is able to see on the teacher's screen the responses of a large number of students simultaneously with the students typing their responses.

A further feature is that the teacher is able to display one or more of these responses to the whole class for the purpose of discussion. This is best done on the Public Display, e.g. an LCD overlay for an overhead projector or a large monitor which can be viewed by all the participants.

A further feature is that an immediate readout is available on the teacher's screen giving a statistical summary as to the number of students who are correct, who are wrong and who haven't responded, as well as an indication next to each student's name, response and seat number as to the correctness of the response.

Because of the time consuming effort to produce preprogrammed lessons there is a need to be able to obtain a score on the performance of the students, and even provide feedback information to the students, even if correct answers have not been pre-programmed. Indeed, such a facility would permit spontaneous teaching and evaluation in Social Mode without any pre-programming.

There is also a need for a teacher to be able to ask spontaneous questions and to use the responses from one group of students to construct the frames of a lesson which can be used at a later time to teach the same or another group of students. This need arises where the responses of students may be in the form of either correct responses, explanatory material or questions posed by the students. This is in contrast to conventional pre-programmed lessons where the teacher must be able to anticipate all possible responses and all possible questions that could be posed by the student.

There is also a need in the field of remote teaching for accessing large numbers of students who may be located in different learning centers spread over a large geographical area, where each learning center contains a multiplicity of students. For such a system to operate in Social Mode many operational as well as cost problems must be overcome.

The system must ideally behave as if all the students are in the same room with the teacher. Thus the teacher must be able to see on the teacher's screen at the Teacher's Center, a large number of responses simultaneously from the Learning Centers as the responses are being answered.

The teacher must be able to display any one or more responses simultaneously to all the students.

Also the teacher must be able to obtain immediately integrated statistics on the performance of all the students in the various centers in order to know if a question is understood and whether material must be retaught.

The students at the remote sites must have the full benefit of any audio-visual devices actuated by the teacher, even if only a telephone link is available.

While providing all the above functions the speed with which each student receives reinforcement must not be impaired. In other words, frames programmed with answers that are intended to supply letter-by-letter reinforcement must still be possible irrespective of the typing speed of a student, the number of students on the system, or the geographical location of the student. If a modem and telephone line were to be provided for each student, the system would become costly, complex and unreliable. The expense would be not only for the hardware which needs to be duplicated for each student, but the communication costs become prohibitively expensive since in essence, one is placing a separate long distance telephone call between the teacher and each student for the duration of the teaching period.

Whatever the merits of prior computerized teaching systems, they do not achieve the benefits of the present invention.

SUMMARY OF THE INVENTION

To overcome the limitations in the prior art described above, and to overcome other limitations that will become apparent upon reading and understanding the present specification, the present invention discloses a computerized teaching system comprising an interactive group communication system, wherein students interact with a teacher, by providing multi-character responses on the teacher's screen, to frames with or without programmed questions, and which result in a quantitative scored report on the performance of each student, and/or feedback signals to each student, irrespective of whether the particular frame is programmed with or without a correct answer.

Furthermore, the teacher is able to ask spontaneous questions and to use the responses from one group of students to construct the frames of a lesson which can be used at a later time to teach the same or another group of students.

Furthermore, the teaching system comprising a multiplicity of Learning Centers and a Teacher's Center, may be located over a large geographic area with a multiplicity of students at each center; wherein the students interact with the teacher at a Teacher's Center, who is remotely located from one or more Learning Centers.

The present invention also allows the display by the teacher at a Teacher's Center of a response of a particular student to a spontaneous or programmed question, on a Public Display, at each Learning Center.

The present invention provides immediate integrated statistics at the Teacher's Center, on the performance of all the students in the various Learning Centers.

The present invention provides control by the teacher at the Teacher's Center, of any audio-visual devices in the various Learning Centers.

The present invention provides immediate feedback on preprogrammed answers to students in the Learning Centers irrespective of the speed of data transmission via the communication channels and irrespective of the typing speed of the students, the number of students on the system, or the geographical location of the students.

The present invention minimizes the number of communication channels in the system. It also minimizes the number of modems in the system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention discloses a computerized teaching system comprising an interactive group communication system, wherein one or more groups of students are located at one or more Remote Learning Centers and the teacher is located in a Teacher's Center.

Figure 1:
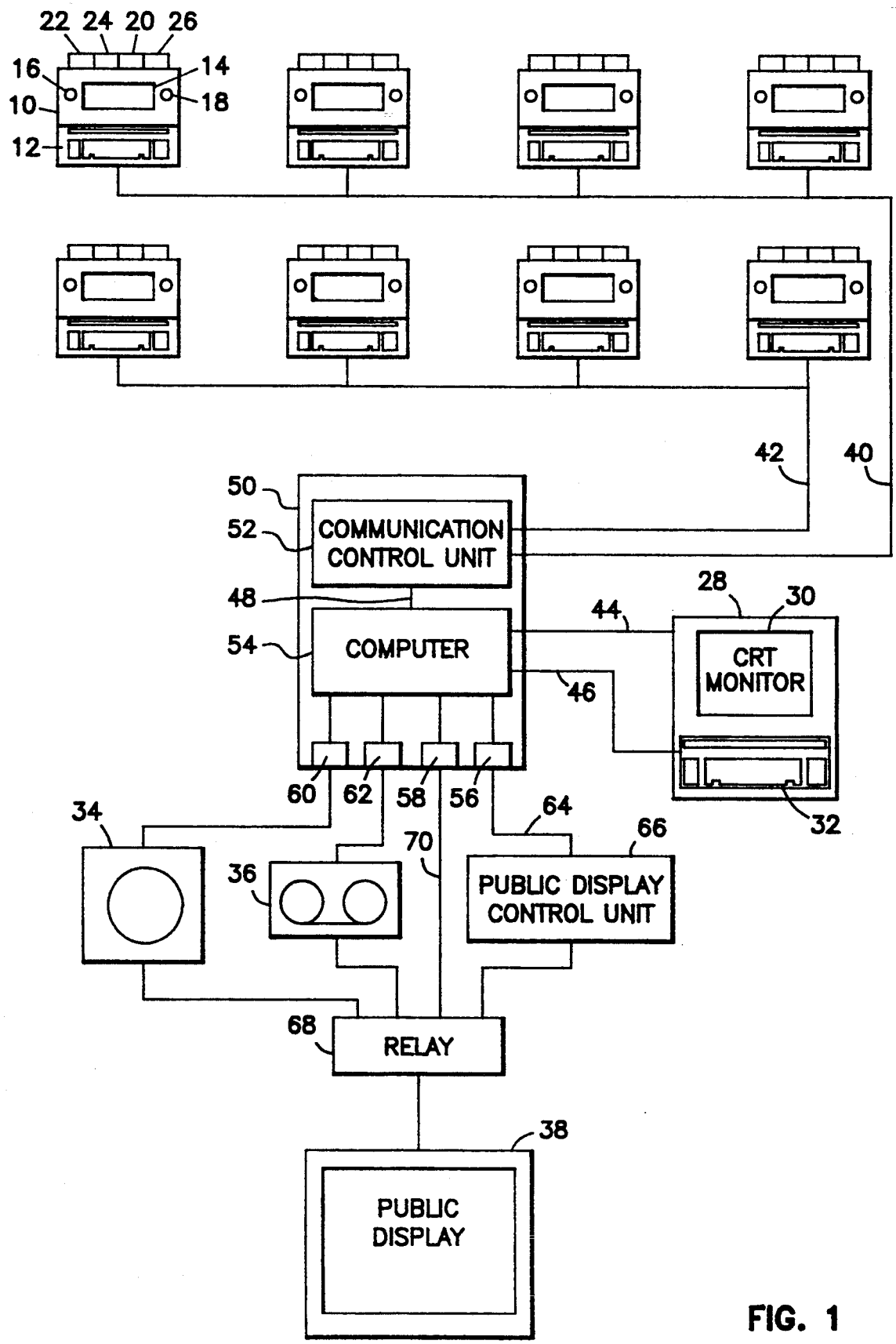
FIG. 1 is a schematic block diagram showing the interconnections of the various components of a system in a particular Learning Center according to the invention.

Each student at a Learning Center is provided with a terminal, which is referred to as a Studycom. Eight such Studycoms are shown in FIG. 1, indicated generally by reference numeral 10. The main features of a Studycom 10 include an alpha-numeric keyboard 12, a multi-line LCD 14, visual reinforcement means 16 and 18, audio reinforcement means 20, terminal identification means 22, a local controller 24, and an audio-visual (A-V) output port 26.

The alpha-numeric keyboard 12 has number keys, letter keys, function keys, control keys, and cursor keys. The function keys permit students to sign-on to the system and to choose a particular group in which each wishes to participate, to edit their responses, to select a frame having information and questions, and to retrieve their previous responses.

The multi-line LCD 14, which includes driver circuitry, displays alpha-numeric or graphic data. Such data can be created in real-time or can be stored in a series of preprogrammed information frames. The information frames may include questions created before the lesson or session. The LCD 14 also displays the characters that the student enters on the keyboard 12.

The visual reinforcement means 16 and 18 may include Light Emitting Diodes (LEDs) in close proximity to LCD 14. The LEDs 16 and 18 flash in different modes depending on what the teacher has input on the terminal in real-time or has preprogrammed, and depending on what the student types on keyboard 12.

The audio reinforcement means 20 may include a Speaker capable of "beeping" in various modes depending on what the teacher has input on his/her terminal in real-time or has preprogrammed, and depending on what the student types on keyboard 12.

The terminal identification means 22 may be in the form of a four-pole Dip Switch. Thus, up to sixteen Studycom 10 may be connected in parallel on a cable. The Dip Switch 22 settings make each Studycom 10 a unique address on the cable.

The A-V Output Port 26 connects the Studycom 10 to an optional Audio-Visual device (not shown). These A-V devices are distinct from the teacher-controlled, group A-V devices described hereinafter.

The Local Controller 24 connects the Studycom 10 to a Central Electronic Unit 50 via cables 40 and 42 and a Communication Control Unit 52. The Central Electronic Unit 50, includes a computer, which includes a Central Processing Unit (CPU), read-only memory (ROM) and random access memory (RAM). The operating program may be provided from a disc drive or downloaded from the computer in the Teacher's Center 304 to be described with reference to FIG. 6. The Computer 54 is connected to the Communication Control Unit 52 and a Public Display Communication Link 56 which controls the Public Display Control Unit 66 via cable 64. A string of characters entering Public Display Communication Link 56 appear on the Public Display 38. The Central Electronic Unit 50 also includes Interfaces 60 and 62 for a Video Disk Player 34 and a Video Cassette Player 36, respectively. It also includes a Relay Port 58 which controls a Relay 68 via cable 70. The Public Display 38 may be connected to the Public Display Control Unit 66, Video Disk Player 34, or the Video Cassette Player 36 by means of the Relay 68.

Communication between the Communication Control Unit 52 and the Local Controller 24 of each Studycom 10 is in the form of a train of pulses on cables 40 and 42. This pulse train may be divided into four parts. The first part of the pulse train is a System Reset pulse for resetting all Studycoms 10. The second part of the pulse train is a Sequential Studycom Number which is an encoded binary number ranging from zero up to the maximum number of Studycoms 120 on a cable 40 or 42. In FIG. 1, four Studycoms 10 are shown on cables 40 and 42, hence, the binary codes range from 0 to 3 on each cable 40 and 42. When a Sequential Studycom Number is transmitted, the Studycom 10 whose Dip Switch 22 matches this number is activated. The third part of the pulse train is an encoded ASCII character, which is received for display on the LCD 14, or which is a control character for output on A-V Port 26. The fourth part of the pulse train is a set of pulses generated by Local Controller 24 by encoding the code for each key pressed on the keyboard 12 into a serial pulse train. This set of pulses is sent back to the Communication Control Unit 52.

The Learning Center in FIG. 1 can become totally independent if it is provided with a Controlcom 28, which includes a CRT Monitor 30 and a Keyboard 32, connected via lines 44 and 46 to the Computer 54. As a stand-alone system the Keyboard 32 and CRT Monitor 30 become the teacher's console. If however the Learning Center is part of a Remote Teaching System then the purpose of the Keyboard 32 and CRT Monitor 30 is to help establish communication with the Teacher's Center on start-up, and it could also be used by a local teaching assistant to monitor either the same student responses which are transmitted to that teacher at the Teacher's Center working in Social Mode, or, because of the ability of the system to support simultaneous separate groups working in Social and Independent Modes (described according to the pending application, of which this application forms a continuation-in part), to monitor a second group of students at the Learning Center working simultaneously in Independent Mode.

Figure 6:
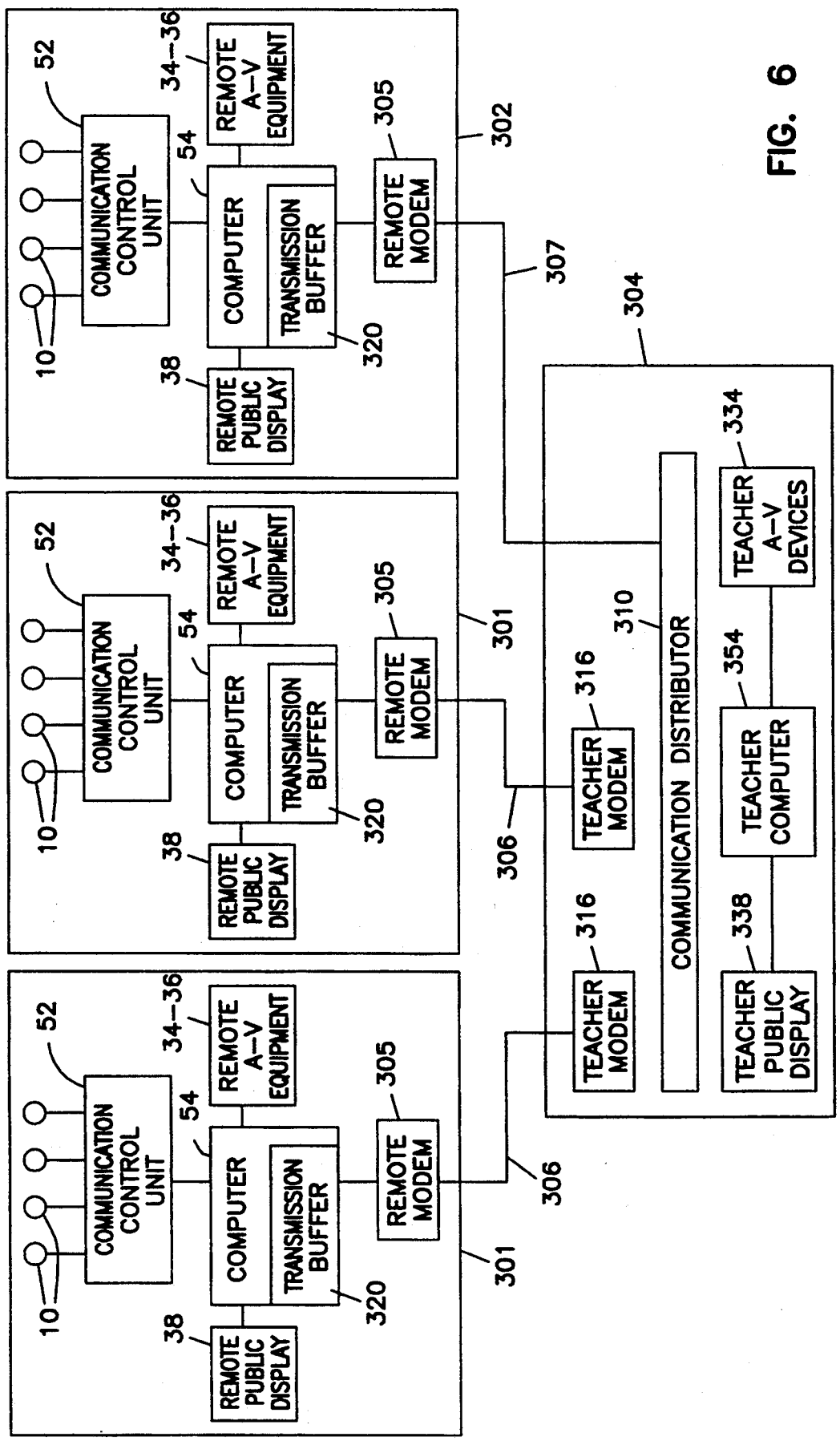
FIG. 6 is a schematic block diagram showing the interconnections of the various components of a remote teaching system comprising various Learning Centers and a Teacher's Center according to the invention.

Communication between Computer 54 and the Teacher's Center 304 to be described in FIG. 6, is via an RS 232 Port, Block 61 in FIG. 1.

Figure 2:
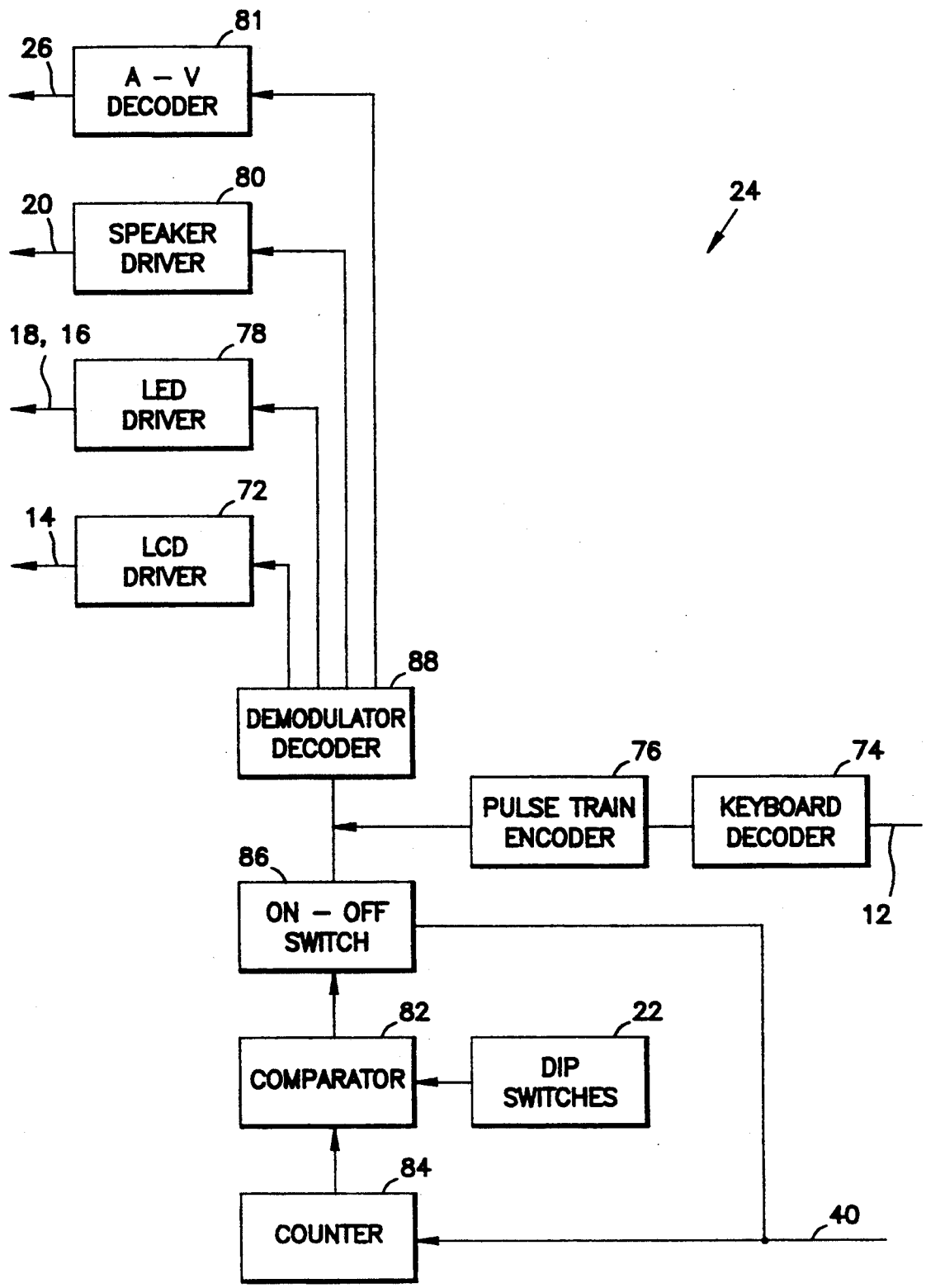
FIG. 2 is a schematic block diagram of a Local Controller in a particular Learning Center.

FIG. 2 shows a schematic block diagram of the Local Controller 24 which is connected to the Communication Control Unit 52 via cables 40 or 42. Demodulator and Decoder 88 feeds the information received to LCD Driver 72 for the LCD 14, LED Drivers 78 for LEDs 16 and 18, Speaker Driver 80 for Speaker 20, and Audio-Visual Decoder 81 for A-V Output Port 26. Local Controller 24 also transmits the characters from the keyboard 12 by means of Keyboard Decoder 74 and Pulse Train Encoder 76 which encodes the keyboard 12 output onto the pulse train present on cable 40.

Dip Switches 22, connected to Comparator 82, determine the Sequential Studycom Number of a particular Studycom 10. Thus, when a pulse train is received on cable 40, including a Sequential Studycom Number, Counter 84 counts on successive rounds after a System Reset Pulse each time a Sequential Studycom Number is received. Should the Sequential Studycom Number be 3, and should the Dip Switch 22 of a particular Studycom 10 also be set to the binary number 3, Comparator 82 will detect the equality and activate the Studycom 10 via on-off Switch 86, while all the other Studycoms 10 on the line remain deactivated. Thus, each Studycom 10 is activated in a cyclical manner, e.g., every 20 milliseconds.

The Demodulator and Decoder 88 recognizes particular control characters and is thereby able to send the correct characters and signals to LCD Drive 72, LED Driver 78, Speaker Driver 80 and A-V Decoder 81.

Figure 3:
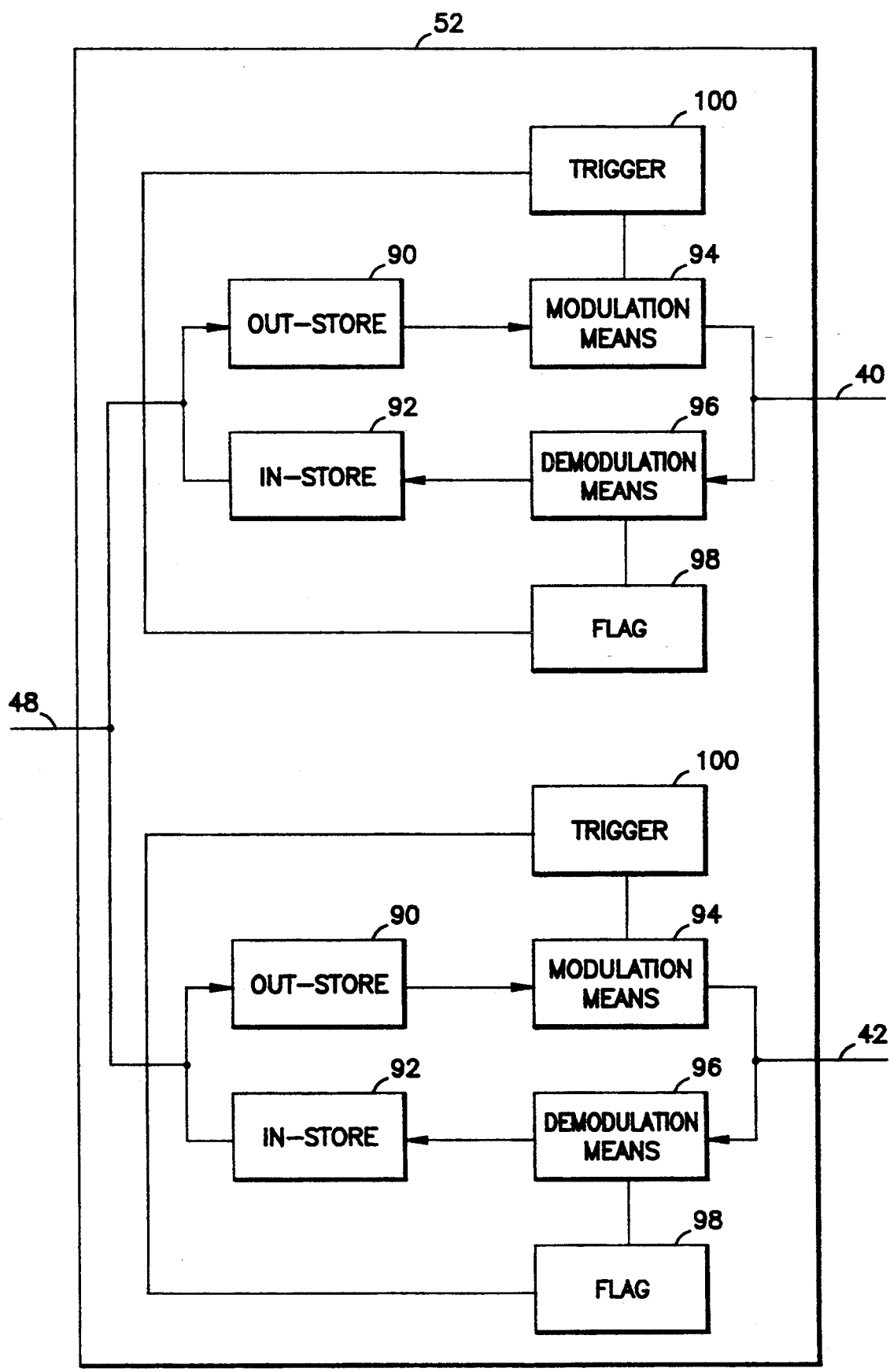
FIG. 3 is a schematic block diagram of a Communication Control Unit in a particular Learning Center.

FIG. 3 shows a schematic block diagram of the Communication Control Unit 52. Two identical circuits are shown, one of which is connected to cable 40 and the other to cable 42. Additional such circuits and cables may be present. Each circuit includes Demodulating Means 96 for decoding an incoming character transmitted by a Studycom 10 from the pulse train and storing it in In-Store 92. Each circuit also includes Modulating Means 94 for generating and encoding a pulse train corresponding to the outgoing character to a Studycom 10, which is stored in Out-Store 90 together with a Sequential Studycom Number and a System Reset pulse if necessary. A Trigger 100 is provided for starting the pulse train and a Flag 98 is provided to indicate that the pulse train has been completed, by the Flag 98 being reset. In practice, the Trigger 100 and the Flag 98 are common for all the lines or cables, 40 and 42. The System Reset pulse is initiated externally and is a negative pulse. The outgoing character is pulse height modulated and the incoming character is pulse width modulated.

The Flag 98 is constantly interrogated by the Computer 54 via Line 48 during the operation of the Communication Control Unit 52. When the Flag 98 is reset, any character present in In-Store 92 is removed for processing and the following cycle of events is triggered by means of Trigger 100: Flag 98 is set; Modulating Means 94 encodes into a pulse train the character from Out-Store 90 plus a Sequential Studycom Number plus a System Reset pulse when the Sequential Studycom Number is 0; Demodulating Means 96 decodes the character received from the Local Controller 24 and stores it in the In-Store 92; and, Demodulating Means 96 resets Flag 98 at the end of the pulse train. Thus, from the instant that Trigger 100 is operated until Flag 98 is reset, the Communication Control Unit 52 works autonomously. Instead of the computer program constantly interrogating the Flag 98, the Communication Control Unit 52 can be triggered by the Computer 54 on receiving a hardware interrupt, as is known to those skilled in the art.

Figure 4:
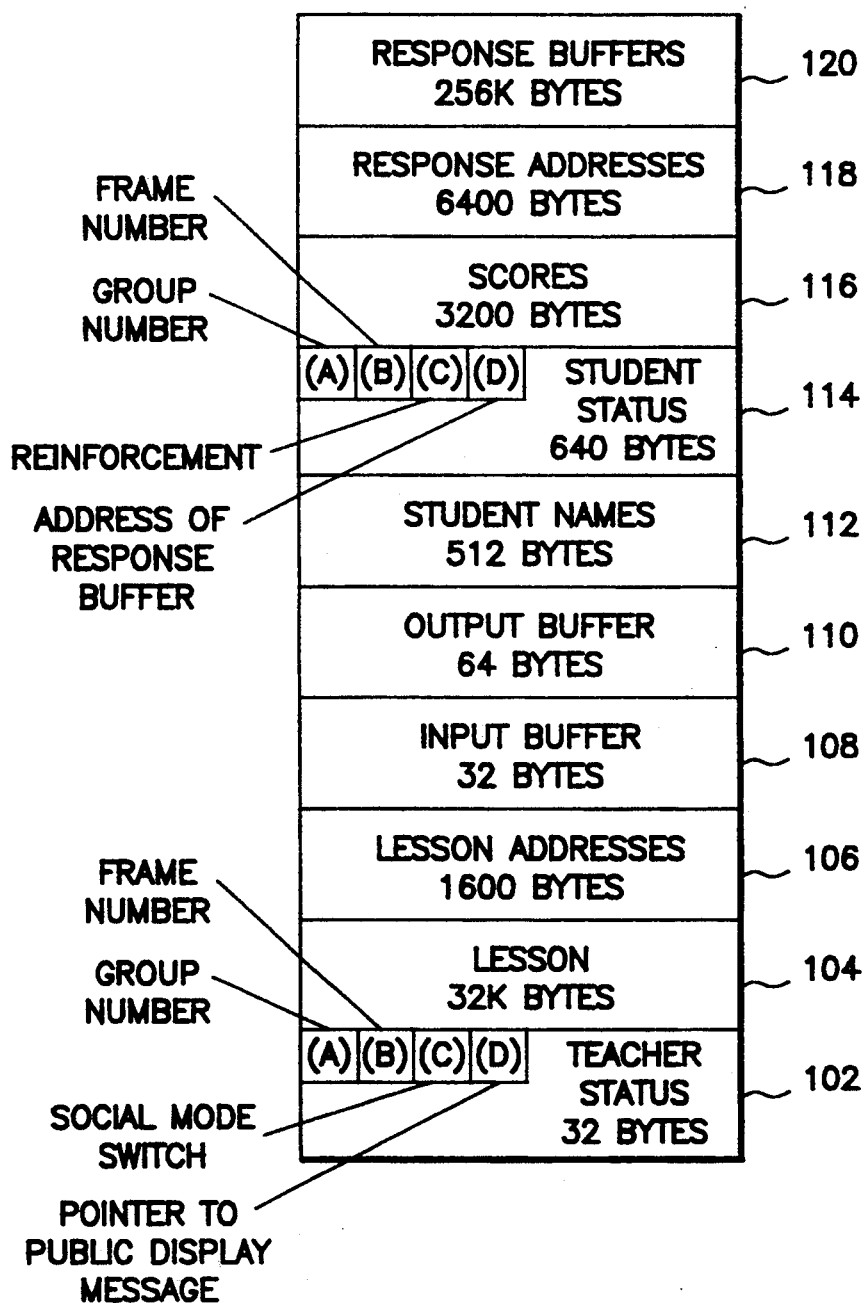
FIG. 4 is a memory map associated with a computer in a particular Learning Center.

FIG. 4 shows a map of the RAM of Computer 54 at the Learning Center, which is partitioned into buffers.

All the students at a Learning Center may be working in Social Mode in conjunction with the teacher at the Teacher's Center, or only some of the students, while the rest work in Independent Mode. In this embodiment it is assumed that there are eight groups, one of which is in Social Mode and the other in separate Independent Mode groups. Typically, the Social Mode group working with the teacher in the Teacher's Center is designated Group number 0.

Data associated with the teacher input from the Teacher's Center 304 to be described with reference to FIG. 6, is stored in Teacher Status buffer 102, which is 32 bytes. This includes the group number to which the teacher is currently addressed (cell (A)); the frame number within the lesson to which the teacher is currently addressed (cell (B)); a Social Mode Switch, comprising 1 byte per group, which is used to indicate which group is in Social Mode (cell (C)); and the address of a Public Message, which acts as a pointer (cell (0)).

Lesson buffer 104 contains as many lessons of variable lengths as there are groups. A Lesson may comprise 100 frames and the Lesson buffer 104 is typically 32 kilobytes in size.

Lesson Address buffer 106 is divided into as many substores as there are groups. Each sub-store is further divided into cells so that each cell contains the address of successive frames of the associated lesson. For example, eight groups with 100 frames per lesson would require 1600 bytes of storage.

Input Buffer 108 has as many bytes as there are students and stores the last character pressed by each student. Typically, Input Buffer 108 would be a minimum of 32 bytes in size.

Output Buffer 110 has as many 2-byte words as there are students. Each word contains the character to be displayed on the LCD 14, as well as the type of reinforcement to be given, and other control information such as are required for the operation of independent A-V devices via A-V Port 26. Typically, Output Buffer 110 would be a minimum of 64 bytes in size.

Student Name buffer 112 is divided into as many sub-stores as there are Studycoms 10 in the system. Each sub-store contains the name of the student who signs in on his Studycom 10. Using 16 bytes per student, 512 bytes would be required ($16 \times 32 = 512$).

Student Status buffer 114 is divided into as many sub-stores as there are students. Each sub-store typically contains 20 bytes of primary data associated with each student. This includes the group number to which a student is currently addressed (cell (A)); the frame number within the lesson to which the student is currently addressed (cell (B)); the type of reinforcement that the student should be receiving, e.g., a short beep on the Speaker 20 and blinking of the LEDs 16 and 18 (cell (C)); and the address within the Student Response buffer 120 to which the student is currently addressed (cell (D)). Typically, the Student Response buffer 114 would require a minimum of 640 bytes ($32 \times 20 = 640$).

Scores buffer 116 is divided into as many sub-stores as there are students. Each sub-store is divided into as many cells as there are frames in the lesson. Each cell contains information on whether the student was right or wrong on a particular frame, the number of tries, etc. Typically, the Scores buffer 116 would require a minimum of 3200 bytes ($32 \times 100 = 3200$).

Response buffer 120 is divided into as many sub-stores as there are students. Each sub-store contains the responses of each student to each frame of the lesson on which the student is currently working. Typically, the Response buffer 120 would require a minimum of 256,000 bytes ($32 \times 8000 = 256,000$).

Response Address buffer 118 is divided into as many sub-stores as there are students. Each sub-store is divided into as many cells as there are frames in the lesson associated with the group number in which the student is working. Each cell contains the address of the response of the student for the particular frame. Typically, the Response Address buffer 118 would require a minimum of 6,400 bytes ($32 \times 200 = 6,400$).

Block 320 is the small Transmission Buffer 320, of say 9 to 48 bytes (depending on the number of Studycom terminals at the Learning Center and the number of Studycom terminals in the whole system), which stores every keystroke made on each Studycom terminal at the Learning Center, together with the relevant Sequential Studycom Number for the time period of a polling cycle done by the computer in the Teacher's Center 304, as described with reference to FIG. 6. This information is transmitted to the Teacher's Center 304 in FIG. 6 via an RS 232 port in the Computer 54.

Figure 5:
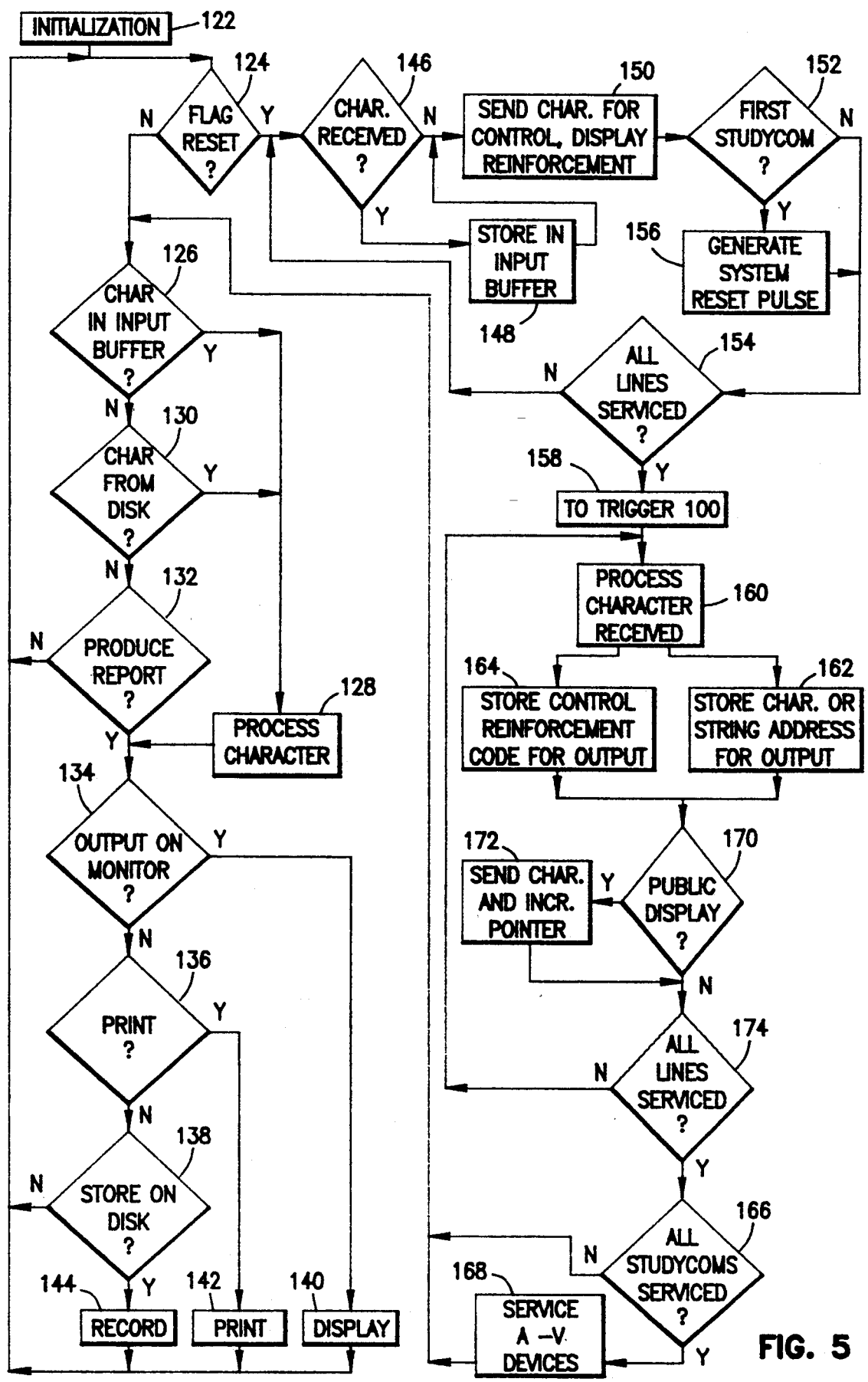
FIG. 5 is a flow chart showing the manner in which information is processed within the system of a particular Learning Center.

FIG. 5 is a flow chart which indicates how information is processed within the system in a Learning Center, comprising the hardware and the program logic stored in RAM in Computer 54. In the flow chart, blocks 126 and 128 describe (a) the transmitting characters sent to the Teacher's Center 304 in FIG. 6 via the RS 232 port of Computer 54, (b) processing characters received from the Teacher's Center 304 via the RS 232 port of Computer 54, and (c) processing characters typed in Controlcom 28 at a Learning Center, if utilized; blocks 130 and 144 describe the servicing of Controlcom Keyboard 32, CRT Monitor 30, Printer and Disk, if utilized at a Learning Center; block 124 and blocks 146 to 158 are associated with the Communication Control Unit 52; blocks 160 to 166 are associated with the Studycom 10; block 168 is associated with the A-V devices 34 and 36; and blocks 170 and 172 are associated with the Public Display hardware 38, 66 and 56.

Block 122 represents the initialization actions, e.g., initialization of printers (not shown), checking that the correct disks (not shown) are in place, and that the registers are properly initialized.

Block 124 determines whether the Flag 98 is set and services Blocks 126 to 144 repeatedly until Flag 98 is reset.

If block 124 determines that Flag 98 has been reset, the Studycoms 10 are serviced in succession, starting off with the first Studycom 10 on cable 40 (Sequential Studycom Number 0). Thus, block 146 examines the contents of In-Store 92 of the Communication Control Unit 52 to determine if a character has been received from a Studycom 10. Block 148 stores the received character in the Input Buffer 108. The same character is also stored in the Transmission Buffer 320 together with the relevant Sequential Studycom Number. Block 150 transfers the outgoing contents, if any, of the Output Buffer 110 to Out-Store 90 of the Communication Control Unit 52. The processing in blocks 146, 148 and 150 is repeated for other Studycoms 10 with the same Sequential Studycom Number on the other cables, i.e., cable 42.

Block 152 determines whether the first Studycom 10 on the first line (corresponding to cable 40) is being serviced, and if so, block 156 initiates a System Reset pulse. Block 154 ensures that all cables 40 and 42 are serviced.

When all Studycoms 10 with the same Sequential Studycom Number on all the cables 40 and 42 have been serviced, block 158 shows that Trigger 100 is to be operated. Block 160 represents the processing of characters stored in Input Buffer 108 for the Nth Studycorn 10 (Sequential Studycorn Number N) on cable 40. The result of this processing may cause a character (out of a string of characters) to be displayed on the LCD 14, so Block 162 provisionally stores it in Output Buffer 110. In addition, Block 164 indicates any reinforcement information in association with the character are also stored in Output Buffer 110. Blocks 162 and 164 can also be used for ASCII and control characters to be stored to be ultimately used in independent A-V devices. This process is repeated for all terminals. Block 174 ensures that all cables 40 and 42 are serviced.

After each Studycom 10 is serviced, Block 170 determines whether a Public Display 38 message is present and if so, Block 172 transmits a character and increments a pointer to the string of characters making up the Public Display message.

The group A-V devices 34 and 36 of a Learning Center may be serviced at different points in the cycle, depending on the time requirements of servicing of these devices 34 and 36. Block 166 ensures that the A-V devices are serviced in Block 168 only after all Studycoms 10 on all lines have been serviced.

After servicing all Studycoms 10 on all the lines, as well as the Public Display 38 and group A-V devices, processing from Block 166 continues at Block 126.

The Studycoms 10 are processed in the following order. In a given round, Block 146 interrogates the Studycoms 10 with Sequential Studycom Numbers N on all lines in succession to determine if there are incoming characters. Then, the outgoing characters in Block 150 are associated with Sequential Studycom Numbers N+1, which were processed in a previous round. Finally, Block 160 processes the Studycoms 10 with Sequential Studycom Numbers N+2 and stores them for output on a future round. The number N is increased with every round until the maximum number of Studycoms 10 is reached and exceeded, at which point N is set back to 0, and the cycle is repeated.

Block 126 may be viewed as representing three different operations (not shown). First, "Does the Transmission Buffer 320 contain characters that must be sent to the Teacher's Center 304 in FIG. 6 via the RS 232 port of Computer 54?" If yes, the characters are processed in Block 128. If the Transmission Buffer 320 does not contain such characters, "Has a character been received from the Teacher's Center 304 via the RS 232 port of Computer 54?" If yes, this character is processed in Block 128. If a character has not been received from the Teacher's Center 304, "Has a character been typed in Controlcom 28 at a Learning Center?" If yes, this is carried out in Block 128. If a character has not been typed in Controlcom 28, the disk is serviced to determine whether characters have been received from the disk.

Characters that have accumulated in Transmission Buffer 320 together with the relevant Sequential Studycom Number are transmitted to the Teacher's Center 304. The character received from the Teacher's Center 304 is used to operate the system in the Learning Center in the same way as if the Keyboard 32 has been typed locally in the Controlcom 28. For this reason it does not matter whether the keys pressed by the teacher is done by the teacher in the Teacher's Center 304 or whether the teacher is located in the Learning Center and is typing on the Keyboard 32 of Controlcom Teacher's Center 304.

Consider first the case where the teacher is in the Learning Center operating the Keyboard 32. In operation, the teacher enters a group number which is stored in Teacher Status buffer 102 of the RAM. The teacher then enters a frame number and constructs a frame, which includes the answer to a question, the question that appears on the Public Display 38, the text that is displayed on the Studycoms 10, the reinforcement that is associated with that question, the score for that question, and the Audio-Visual devices that must be activated.

Alternatively, with the help of Disk Logic block 130, several lessons, each of which comprise many frames, are loaded from disk into buffers 104 and 106.

Next, each student enters a group number, e.g., say 3, which is stored in the Student Status buffer 114, and then enters his name which is stored in Student Name buffer 112.

In Independent Mode, a student may address his Studycom 10 to a particular frame of a lesson which is associated with his group by pressing function key F1 followed by the frame number. This gets stored in Student Status buffer 114, which with the Lesson Address buffer 106 causes the Studycom 10 to be addressed to the particular frame. The student then proceeds to respond.

The student's response is stored in the Response buffer 120 and the address of the response in the Response Address buffer 118. Block 160 compares the student's response at every keystroke with the answer of the frame in the Lesson buffer 104. Depending on the reinforcement prescribed for each character of the response as indicated for that frame in Lesson buffer 104, the reinforcement to be given is stored in the Student Status buffer 114. If it is programmed that reinforcement is to be provided on every letter, then this occurs if the character entered by the student matches the corresponding character of the answer of that frame in Lesson buffer 104. Block 150 displays the particular character with the reinforcement. Furthermore, depending on the score associated with that frame, a score is inserted in Score buffer 116. For example, if the student correctly responds with "TEXAS", then the student is awarded 3 points for that frame.

In contrast, students operating in Social Mode are barred from addressing themselves to a particular frame by blocking function key F1. Only the teacher is able to address the Studycoms 10 to a particular frame in Social Mode.

To place a particular group in Social Mode, the teacher addresses him/herself to that group (cell (A)), and sets the corresponding Social Mode Switch (cell (C)) in the Teacher Status buffer 102. Block 160 inspects the Social Mode Switch and blocks any attempt by a student within the Social Mode group to address to a particular frame by blocking function key F1.

The teacher addresses to a particular frame in the lesson associated with the group. For example, when a frame number is entered by the teacher, it is recorded in the Teacher Status buffer 102 (cell (B)) and in the relevant frame number location of the Student Status buffer 114 (cell (B)) for each student in the group. Thus, this arrangement requires that all students in the group work only in concordance with the teacher in Social Mode, while other students may work in Independent Mode.

In addition, the teacher may ask a spontaneous question of the group instead of addressing a preprogrammed frame. This is accomplished by the teacher typing a frame number and pressing a key, which prepares the system for receiving responses. The frame number refers to an 'empty frame', since no relevant information is present in Lesson Buffer 104. The frame number is stored in cell (B) of Teacher Status buffer 102 and in cell (B) of Student Status buffers 114 for each student. After the students start responding to the spontaneous question, the teacher may choose to construct the frame, and in particular, the correct response. Thus, students can respond even if the lesson has not been preprogrammed and stored, which is contrasted with the conventional use of computer-assisted instruction.

A student's response in Response Buffer 120 is compared via Block 160 with the correct response, if present, in Lesson Buffer 104. Block 160 evaluates the students' responses, which may produce feedback information on the Controlcom monitor 30 and, if programmed, visual reinforcement via LEDs 16 and 18 and audio reinforcement via Speaker 20.

Since the addresses of the responses of any student to any frame are available from the Response Address buffer 118, the student names are available from the Student Name buffer 112, and the current group number and frame number of students and the teacher are available from cells (A) and (B) of the Student Status buffer 114 and Teacher Status buffer 102, respectively, block 132 produces a response report on the monitor 30 of the Controlcom 28, listing the student name and the associated current response of each student within a group. By numbering these responses, or noting their location on the screen 30, or typing the response number on the keyboard 32, or using a 'mouse' to point to the response, the address of any response can be stored in cell (D) of Teacher Status buffer 102. This address is the pointer if the response is to be placed on the Public Display.

Blocks 170 and 172 cause the string of characters of the response to be transmitted via Public Display Communication Link 56 and the Public Display Control Unit 66 to Public Display 38 with minimum time interference to the rest of the system.

After the students start responding to the spontaneous question, the teacher rather than constructing a frame containing the correct response which is stored in Lesson Buffer 104, may use a student's response from the teacher's monitor 30, which the teacher knows to be correct. For example, this is done by transferring the known correct response to the Lesson Buffer 104 from the Response Buffer 120. This is possible since the source address of the response in Response Buffer 120 is given in Response Addresses buffer 118 while the destination address in Lesson Buffer 104 is marked in Lesson Addresses buffer 106.

Transferring a response from Response buffer 120 to Lesson Buffer 104 is best achieved by displaying on the Teacher's Controlcom Monitor 30 in real time, the responses of several students in juxtaposition to the names of the students and their seat numbers. Then, by pointing to a response with a pointer such as a mouse and pressing ENTER, that response is read off the screen directly. Alternatively, by using the address in Response Address buffer 118, the response may be read into Response Buffer 120. This response is then moved into Lesson Buffer 104. There the response can be compared with all other responses by means of a comparator such as in Block 160 as is the case with a pre-programmed correct response. Consequently, feedback information concerning the result of the comparisons can be produced on the Controlcom Monitor 30 and reinforcement can be given via LEDs 16 and 18 and audio reinforcement via speaker 16. Simultaneously correct scores are inserted, for all students with the same responses, in the Scores Buffer 116.

Rather than transferring a particular response from the Response Buffer 120 to Lesson Buffer 104 as explained above, the particular response could remain in Response Buffer 120. The comparator in Block 160 then compares a particular response with all other responses in Response Buffer 120. Also, instead of using the complete response of a particular student, one word of a particular response can be utilized to seek a match with a word imbedded within the other responses.

It was stated above that the teacher may transfer a correct response from the Response Buffer 120 to Lesson Buffer 104. This is analogous to a response within a programmed frame in the Lesson Buffer 104 with which other responses are compared. Similarly the teacher may ask a spontaneous question and choose to transfer any response from the Response Buffer 120 to the Lessen Buffer 104 to become part of a frame in various forms, e.g. it may become the question to be asked by the teacher at a future time, or it may become a message to be displayed on each Studycom Screen 14 or a message to be displayed on the Public Display 38. In this way the teacher can construct a series of frames which make up a lesson program comprising the responses of students. This is in contrast to the known art where lessons are pre-programmed by the teacher before students are requested to respond.

Score Buffer 116 contains cells for each student for each frame and each cell contains information on whether the student is right or wrong on that frame. In addition the number of tries, as well as other desired parameters, are stored in the Score Buffer 116. Also, the number of tries can be replaced with a symbol. Thus if the students are asked to name a prominent harbor, the student responses may include, Los Angeles, San Francisco and New York. On pointing with the mouse to Los Angeles, all students who respond with Los Angeles may have an A placed in the Scores Buffer 116. Similarly B and C will be placed for San Francisco and New York, respectively. From the Scores Buffer 116 it is now possible to count the number of students who "scored" A, B and C. From this information, the number of students selecting each answer choice may be displayed on the Teacher's Monitor 30 in the form of a bar graph.

Thus, by considering all responses in succession, a bar graph can be produced by the teacher or group leader verbally asking an open ended question such as "what emotion does it arouse in you?" The bar graph may be produced from the Score Buffer 116 by pressing a pre-programmed function key rather than selecting responses manually using a mouse.

FIG. 6 illustrates a computerized teaching system comprising a multiplicity of learning centers which may be spread over a large geographic area. Two typical types of remote learning centers 301, 302 are connected to a Teacher's Center 304. Blocks 301 and 302 are similar and show a multiplicity of Studycom Terminals 10 connected to a Communication Control Unit 52 which in turn are connected to a computer 54 as shown in FIG. 1. Each computer 54 contains interfaces to a public display unit 38 on which messages to all the students in the learning center can be displayed, and audio-visual equipment 34-36 capable of displaying A-V information to all the students at the particular learning center. The difference between Blocks 301 and 302 is that 301 is remotely located geographically from the Teacher's Center 304 and therefore needs a modem 305 and a Communication Channel 306, whereas block 302 is located in the same room as the Teacher's Center 304. Thus, students in Learning Center 302 are physically present with the teacher in Teacher's Center 304 and therefore do not need modems on line 307 which connects Blocks 302 and 304. Communication Channels 306 can be a telephone line or a microwave link or one of several other options for long distance transmission of data. Modem 305 is connected to computer 54 via an RS 232 port.

The Teacher's Center 304 comprises a computer 354, including keyboard and screen, connected to a public display interface 338 and A-V devices 334. This computer serves as the teacher's or group leader's terminal. The logic flow is the same as discussed above with reference to FIG. 5 except for the following.

In one mode of operation Block 160 can evaluate as to whether a particular character from a particular student is correct. However, this is done for the sake of producing a report to appear on the screen of Computer 354 via Blocks 132 and 134 or to be printed out on a printer via Block 136. It is not done for supplying reinforcement for each remote student as this would be too slow. Reinforcement is provided by the local computer 54 at each Learning Center 301. In addition, where the production of reports via Blocks 132, 134 and 136 at the Teacher's Center 304 is essential, it is optional at the Learning Centers 301. Finally, BLock 126 of FIG. 5 provides communication with the Learning Centers 301. The program in computer 354 has a memory map which resembles the memory map in Computer 54 as shown in FIG. 4, except for Transmission Buffer 320.

The computer 354 is also connected to Communication Distributor 310 to which modems 316 are connected which in turn are connected to Communication Channels 306. Communication Distributor 310 includes RS 232 ports each of which is connected to Modems 316 and which are polled in sequence by a multiplexor.

When an independent video channel, not shown in FIG. 6, exists between the Teacher's Center 304 and the Learning Centers 301, information from the computer 354 can be fed via public display interface 338 into the independent video channel to the TV monitors (not shown) of the independent video channel in the Learning Centers 301 and 302.

Similarly, the local A-V devices 34-36 are also not essential if the information from A-V devices 334 is fed into the independent video channel to the TV monitors in the Learning Centers 301 and 302.

As stated previously, the computer 54 in Learning Center 301 need not have a Keyboard 32, CRT Monitor 30 and a Controlcom 38, if all information fed to it comes from Computer 354 in the Teacher's Center 304, and if initiation of the system can be accomplished remotely from Computer 354. This is especially true if the start-up program is located in a ROM inside Computer 54. However, in many instances it is preferred to have a Keyboard 32 and a CRT Monitor 30 in Learning Center 301 since as stated previously, a local person such as a teaching assistant may be placed in the Learning Center 301 for both disciplinary reasons and for coordinating with the teacher in the Teacher's Center 304. Thus the teaching assistant is able to monitor the student's work locally, while the teacher in 304 can monitor the students in all the Learning Centers 301, 302.

In the case of a pre-programmed lesson, the lesson information may be stored on the disk of computer 54 or else all information can be transmitted from computer 354 to the computers 54 as soon as it is required.

Every keystroke of every student is stored in Transmission Buffer 320 (shown in FIG. 4 and also illustrated as a block in Computer 54 in FIG. 6) together with the relevant Sequential Studycom Number from where it is transmitted to the computer 354 via modems 305 and 316 and Communication Channel 306 when computer 354 calls for it. (In another embodiment it can also store the result of a comparison between student responses and a programmed correct response so that this evaluation need not be done by the Teacher's Computer 354.) Computer 354, with the aid of Communication Distributor 310, multiplexes the RS 232 ports and Modems 316, to which they are connected, and receives the data from the Transmission Buffer 320.

The average typing speed of a student is in the order of ten character per second. Assuming there is an aggregate of 100 students in all the learning centers, one would statistically expect that the total number of keystrokes per second would on the average not exceed 1000 and in practice it would not exceed 300.

When the student responds with the first keystroke, that keystroke gets placed in the Transmission Buffer 320 together with the Sequential Studycom Number (which bears a direct relationship to a particular seat number) in the particular class. The speed at which the multiplexor within Communication Distributor 310 completes a round of polling is dependent on the speed at which it is desirable to have the students responses appear on the teacher's screen in Computer 354. Assuming that a complete round of polling is completed in 1/10th of 1 second then the number of keystrokes that will have accumulated in the total system will be 1/10 of about 300 characters which is 30 characters, or 3 characters per learning center if there are 10 centers.

When computer 354 calls for information to be transmitted via modems 305 and 316 and Communication Channel 306, the keystrokes made at each Learning Center 301 and 302 together with the, say two Sequential Studycom Numbers are transmitted. Thus there is a total of 3×3=9 characters transmitted per 1/10 of a second per learning center or 90 per second. Thus a low speed modem (e.g. 2400 Baud or 240 characters per second), such as used on an ordinary telephone line is sufficiently fast to handle the information. The amount of buffer space reserved for each student within transmission buffer 320 need hold say 3 keystrokes, i.e., 3×3=9 bytes but in practice it is made larger.

In operation, the teacher in the Teacher's Center 304 may send a pre-programmed lesson from Computer 354 to Computers 54 via Communication Channels 306 using Modems 316 and 305 where applicable. Next the teacher in the Teacher's Center 304 presses the key marked SIGN ON in the computer 354 on the keyboard of the computer. This keystroke is transmitted via Blocks 310, 316, 306, 305 to Computer 54 where, using Logic Blocks 126–128 a program stored in Computer 54 causes the message PLEASE ENTER YOUR NAME to appear on all the Studycoms 10. When the students respond on Studycoms 10, each character is stored in Transmission Buffer 320 together with the relevant Sequential Studycom Number. Computer 354 successively polls every Learning Center 301 by means of Communication Distributor 310 and receives from Transmission Buffers 320 every keystroke (with the relevant Sequential Studycom number of every student) which have been stored during the round of polling. Thus, it is possible for a program in Computer 354 to draw up a table in RAM memory showing the name of each student at each Learning Center and the Sequential Studycom Number there. The Sequential Studycom Number is translated from a table into seat numbers consisting of an alpha letter followed by a digit, e.g. A5. If the Sequential Studycom Number in each Learning Center 301 and 302 is preceded with a different alphabetical letter one can henceforth show the responses of as many students simultaneously as will fit onto a screen together with the name of the student, the student's learning center designation and seat number. Successive screens display the performance of all the students.

In Social Mode (which means that the teacher controls the pace of the lesson, frame by frame), the teacher in Teacher's Center 304 chooses a frame from a programmed lesson (in Lesson Buffer 104 in Computer 354), say frame number 21, containing a question programmed for displaying on the Public Display 38 by typing 21 and then pressing a key marked PUBLIC. If the programmed lesson is also stored on the disks in Computer 54, the teacher's keystrokes are transmitted via modems 316 and 305 and Communication Channel 306 to Computer 54 where, by virtue of Logic Blocks 126–128, it causes the question from frame 21 of the lesson program stored in Computer 54 to appear on the Public Display 38. However, if no lesson program is stored in Computer 54, then the whole frame 21 from computer 354, including the answer to the question, is transmitted via Communication Distributor 310 and modems 316, 305 and Communication Channel 306 to computer 54 causing the question to appear on the Public Display 38. Alternatively, the question can be posed verbally by the teacher via an independent video channel, if that exists, or via voice communication on telephone lines.

When the teacher presses a key designated PLEASE ANSWER on the keyboard of the computer 354 in the Teacher's Center 304, this keystroke is transmitted as all others via Blocks 310, 316, 306 and 305 to Computer 54 where by virtue of Blocks 126–128 it activates the Studycoms 10 where the message PLEASE ANSWER appears. If the frame includes a question embedded within it, say, frame number 21, then instead of PLEASE ANSWER the actual question appears.

When the students respond, the local computer 54 supplies the reinforcement feedback to the students in the particular learning center since computer 54 is able to compare the student's response, letter by letter with the correct response supplied by the lesson program.

Since the lesson program is stored in the lesson Buffer 114 of computer 354 the program is able to compare each student's keystroke with the correct answer to the question irrespective of the fact that a similar comparison is made in Logic Block 160 at the Learning Center 301 and 302. It is therefore able to display a screen as shown in Table 1 below.

TABLE 1

| | | |
|---|---|---|
| 75% Responded | 50% correct | |
| BD1 | John Brown | -R-Washington |
| BD2 | Mary Smith | -R-George Washington |
| CC3 | Tracy Lewis | -X-Lincoln |
| DA1 | Hilary Green | - |

Table 1 shows a total of four students of which two are in learning center B with seat numbers D1 and D2; one is in learning center C with seat number C3; and one is in learning Center D with seat number A1. The total number of students who have responded is shown as 75% of which 50% have responded correctly and have the letter R placed near the name. Student Tracy Lewis, designated CC3, gave the wrong answer and therefore has the letter X next to the name.

The student in DA1 has not responded. In the present embodiment of the invention, Computer 54 at the Learning Centers 301 provides the reinforcement signals to Studycoms 10 when a student's response is found to be identical to the correct response stored in the Lesson Buffer 104, as a result of a comparison by means of Block 160 in FIG. 5. For constructing the display, shown in Table 1, on the teacher's screen in Teacher's Center 304, there are two major alternatives for determining whether a particular student's response is right or wrong. Either the correctness information from Block 160 is placed in Transmission Buffer 320 together with Sequential Studycom Number, from where it is transmitted to the teacher's computer 310 in Teacher's Center 304 via communication channel 306, or, as explained earlier, only the student's keystrokes are transmitted together with identifying information to the Teacher's Center 304 and Teacher's Center 304 is provided with a comparator and program similar to that in Learning Center 301 so that the student's response can be compared with the correct responses stored in the Lesson Storage Buffer 104 in computer 354 and the correctness information determined accordingly.

As stated above, in the present embodiment of the invention, Computer 54 at the Learning Centers 301 provides the reinforcement signals to Studycoms 10 when a student's response is found to be identical to the correct response stored in the Lesson Buffer 104 as a result of a comparison by means of Block 160 in FIG. 5. Hence the delay time for this reinforcement or feedback is independent of the number of Learning Centers or the processing time of Computer 354 in the Teacher's Center 304 or the total number of students on the system, or the rate of data transmission in Communication Channel 306.

In another embodiment, where a requirement exists for a very large number of Student Terminals 10 to be placed in a single location together with a teacher's computer, and it is essential to maintain as fast a response time as in a small system, the interconnections in the system can be precisely as in FIG. 6 except that modems are not required. In other words in FIG. 6, Learning Centers 301 are replaced by Learning Center 302.

Since all the responses are available to the teacher, it is clear that any response can be displayed to all the students on the Public Display 38 in the various Learning Centers 301 and 302.

Since every keystroke of the teacher can be transmitted to the remote learning centers, the remote Audio-Visual devices 34–36 can be activated by the teacher in the Teacher's Center 304. Alternatively the teacher can call for a frame in which is embedded the command to operate the remote A–V devices 34–36.

Also when the teacher in Teacher's Center 304 notices an unanticipated response which is correct it is clear that the teacher is able to send this response to the computers 54 preceded by a suitable designated standard encoded message which causes the student responses stored in the response buffer of computers 54 to be compared with the unanticipated response. Thus, similar responses are scored as being correct.

Figure 7:
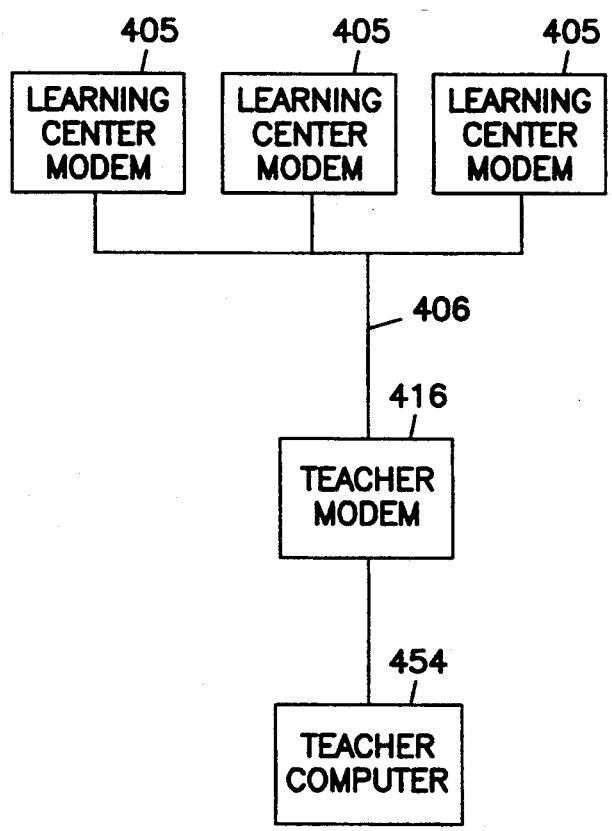
FIG. 7 shows part of an alternative embodiment of the invention in which a single communication line is time shared by the various learning centers.

FIG. 7 illustrates an alternative way of joining the Learning Centers 301 with the Teacher's Center 304. This system saves costs where the Teacher's Center 304 is a relatively long distance away from the Learning Centers 301 compared to the distances between the Learning Centers 301.

Communication Channel 406 joins the modems 405 of the Learning Centers 301 in a T configuration. Modem 416 of the Teacher's Center joins Teacher's Computer 454 to Communication Channel 406.

Modems, at the learning center end, have transmission channels which are connected in a star connection to a common transmission channel 406. This is made possible by the fact that the various Communication Channels 406 in FIG. 7 in the particular embodiment described carry information one at a time.

Referring now back to FIG. 6, the system operates by virtue of a configuration program which is run by each Computer 54 before the lesson starts or by hardware settings of dip switches within each Computer 54. In either case a number is designated for each Computer 54 which the computer itself can read. This number is a unique, identification code.

The teacher's computer activates the Computer 54 at a particular learning center by sending out the computer number suitably encoded before each command. By comparing this number with the number which is already stored in the computer by virtue of the configuration file or the dip switch setting, the particular Computer 54 is selected and activated.

In summary, a computerized teaching system has been described which comprises an interactive group communication system, wherein students interact with a teacher and the teacher can obtain quantitative reports on student performance without pre-programmed lessons and where a lesson program can be constructed from the responses of the students. Further, the teaching system may be spread over a large geographic area comprising a multiplicity of learning centers with a multiplicity of students at each center, wherein the students interact with a teacher who is remotely located from one or more learning centers.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electronic teaching system comprising:
   (a) at least two learning centers having a plurality of participant alpha-numeric terminals, each with a common computer and a common communication control unit;
   (b) a group leader terminal, located within a teacher's center, wherein the group leader terminal includes a keyboard, screen, memory and logic means for displaying multi-character response information from the memory onto the screen;
   (c) communication distribution means within the teacher's center for communicating with learning centers via a plurality of communication channels;
   (d) a transmission buffer within the memory of the common computers in the learning centers for continuously transmitting the multi-character responses, and adapted for storing at least the keystrokes of all the participant terminals in the relevant learning center together with terminal identifying information for the keystrokes for at least the time period between successive communications from the communication distribution means;
   (e) means in the communication channels for transmitting the information from each transmission buffer to the memory of the group leader terminal, the information then being displayed on the screen of the group leader terminal, contemporaneously with the multi-character responses being entered at the participant terminals; and
   (f) social mode means for coordinating participant terminals within the learning centers to collectively respond to a particular question indicated by the group leader terminal.

2. The system of claim 1, wherein one of the learning centers with a multiplicity of participant terminals is remotely located from the teacher's center.

3. The system of claim 1 wherein the two learning centers are each provided with separate lesson storage means and separate comparator means adapted to compare a response from a participant's terminal with a programmed correct response in the lesson storage means.

4. The system of claim 3 wherein a reinforcement signal is transmitted to the relevant participant's terminal when the comparison is favorable, wherein transmission of the reinforcement signal is independent of transmission rates between a particular learning center and the teacher's center.

5. The system of claim 3 wherein the result of comparison is transmitted to the group leaders's terminal for display on its screen.

6. The system in claim 1 wherein the group leader terminal further comprises lesson storage means and a comparator for comparing a participant's response with a programmed correct response stored in the lesson storage means, the result of the comparison being displayed on the group leader terminal.

7. The system in claim 1 wherein the learning centers are provided with a public display monitor operable from the common computer in the learning center and the group leader terminal is adapted to send characters to the common computers in the learning centers which appear on the public display monitor in each learning center.

8. The system in claim 7 wherein the group leader terminal is further adapted to send a participant's response from the memory of the group leader terminal for display on the public display monitors in the learning centers.

9. The system in claim 7 wherein the group leader terminal further comprises means for sending a participant's response from the memory of the group leader terminal to the memory of the common computer in the learning center to be displayed on the public display monitors in the learning centers.

10. The system in claim 1, wherein each of the learning centers are each provided with a public display monitor operable from the common computer and the common computer is provided with lesson storage means, the group leader terminal being adapted to send characters to the common computers in the learning centers to cause a message from the lesson storage means to appear on the public display.

11. The system in claim 1, wherein each of the learning centers are provided with audio visual devices operable from the common computer, the group leader terminal being adapted to send characters to the common computers in the learning centers to activate the audio visual devices.

12. The system of claim 1, wherein the group leader terminal further comprises means for selecting an unanticipated multi-character response of a participant terminal and comparing the unanticipated multi-character response with the multi-character responses from other participant terminals.

13. The system of claim 12 wherein the group leader terminal further comprises a score buffer for storing the results of the comparison.

14. The system of claim 12 wherein the number of responses of a similar types are counted and displayed.

15. The system of claim 12 wherein the participant terminals are provided with reinforcement means, for reinforcing a favorable comparison between the selected unanticipated response on the group leader terminal and the responses from other participant terminals.

16. The system of claim 1, wherein a communication channel is provided with a modem at both ends, between each of the learning centers and the group leader terminal.

17. The system in claim 1, wherein the group leader terminal further comprises means for sending a unique identification code to the common computer of each learning center and wherein the learning centers share a common communication channel, the common computers at the learning centers being adapted to respond only to the unique identification code for that computer.

18. An electronic teaching system, comprising:
(a) at least one group leader terminal;
(b) a plurality of participant terminals connected to the group leader terminal, wherein the participant terminals collectively address a frame without a particular programmed correct response;
(c) communication control means for receiving multi-character responses from the participant terminals;
(d) means for storing student responses in a student response storage means;
(e) data processing logic means for simultaneously displaying the participant terminal multi-character responses on the group leader terminal as the participant terminal multi-character responses are received by the communication control means; and
(f) means for selecting from the group leader terminal one of the displayed participant terminal multi-character responses and immediately comparing the participant terminal multi-character response with other responses from the student response storage means, the responses being scored correct where a match occur.

19. The system in claim 18 further comprising reinforcement means for indicating the correctness of one of the participant terminal multi-character responses on all the participant terminals that provide the correct responses.

20. An electronic teaching system, comprising:
(a) at least one group leader terminal;
(b) a plurality of participant terminals connected to the group leader terminal, wherein the participant terminals collectively address a frame without a particular programmed correct response;
(c) communication control means for receiving multi-character responses from the participant terminals;
(d) means for storing student responses in a student response storage means;
(e) data processing logic means for simultaneously displaying the participant terminal multi-character responses on the group leader terminal as the responses are received by the communication control means;
(f) means for selecting from the group leader terminal one of the participant terminal multi-character responses and comparing the response with other responses from the response storage means; and
(g) means for displaying the number of participant terminal responses that are similar.

21. An electronic teaching system comprising:
at least one group leader terminal;
(b) a plurality of participant terminals connected to the group leader terminal;
(c) subject matter storage means for storing a lesson program comprising a plurality of frames;
(d) communication control means for receiving multi-character responses from the participant terminals;
(e) means for storing student responses in a student response storage means;
(f) data processing logic means for simultaneously displaying the participant terminal multi-character responses on the group leader terminal as the responses are received by the communication control means; and
(g) means for selecting from the group leader terminal one of the participant terminal multi-character responses and storing it as part of a frame in the subject matter storage means.

* * * * *

UNITED STATES PATENT AND TRADEMARK OFFICE
CERTIFICATE OF CORRECTION

PATENT NO. : 5,437,555

DATED : August 1, 1995

INVENTOR(S) : Jakob Ziv-El

It is certified that error appears in the above-indentified patent and that said Letters Patent is hereby corrected as shown below:

In column 7, line 42, "(0)" should read --(D)--;

In column 9, lines 31 and 32, "Studycorn" should read --Studycom--.

Signed and Sealed this

Fifth Day of March, 1996

Attest:

BRUCE LEHMAN

Attesting Officer   Commissioner of Patents and Trademarks